United States Patent [19]
Moyer

[11] 3,895,882
[45] July 22, 1975

[54] WINDMILL STRUCTURE

[76] Inventor: Robert D. Moyer, c/o B. & J. Distributors, R.R. 1, Box 39, Star City, Ind. 46985

[22] Filed: Apr. 17, 1974

[21] Appl. No.: 461,632

[52] U.S. Cl. .................................... 415/2; 416/9
[51] Int. Cl.² ........................................ F03D 7/06
[58] Field of Search ............ 416/9, 13, 197; 415/2, 415/3

[56] References Cited
UNITED STATES PATENTS

| | | | |
|---|---|---|---|
| 1,341,045 | 5/1920 | Currey | 416/197 UX |
| 1,365,371 | 1/1921 | Camet | 415/2 |
| 1,465,602 | 8/1923 | Gentry | 415/2 |
| 1,523,295 | 1/1925 | Ryan | 416/9 UX |
| 1,614,268 | 1/1927 | Wilson | 416/9 UX |
| 1,808,874 | 6/1931 | Wilson | 415/2 |
| 1,974,008 | 9/1934 | Biehn | 415/2 |
| 2,129,652 | 9/1938 | Dean | 416/117 |

FOREIGN PATENTS OR APPLICATIONS

| | | | |
|---|---|---|---|
| 575,587 | 8/1924 | France | 415/2 |
| 727,649 | 6/1932 | France | 416/197 |
| 258,955 | 1926 | United Kingdom | 416/9 |
| 264,219 | 1927 | United Kingdom | 416/119 |

Primary Examiner—Everette A. Powell, Jr.
Attorney, Agent, or Firm—Olson, Trexler, Wolters, Bushnell & Fosse, Ltd.

[57] ABSTRACT

The embodiment of the invention disclosed herein is directed primarily to structural improvements in power conversion devices which are used in the field of mechanical and electrical machines. The power conversion device here is an improved windmill structure which eliminates the need of support frames of either the stationary or movable type. Substantially all of the components of the windmills to be erected are active components with a minimum of support structure. The function and cooperation of the active components is such as to provide sufficient rigid support for the entire structure. A movable shield is formed about one-fourth of the wind-engaging blades and its position relative to the wind-engaging blades is changed by changes in wind direction. Vertically disposed arcuately shaped wind-engaging blades are supported by the rotating shaft positioned relative to the wind shield.

7 Claims, 3 Drawing Figures

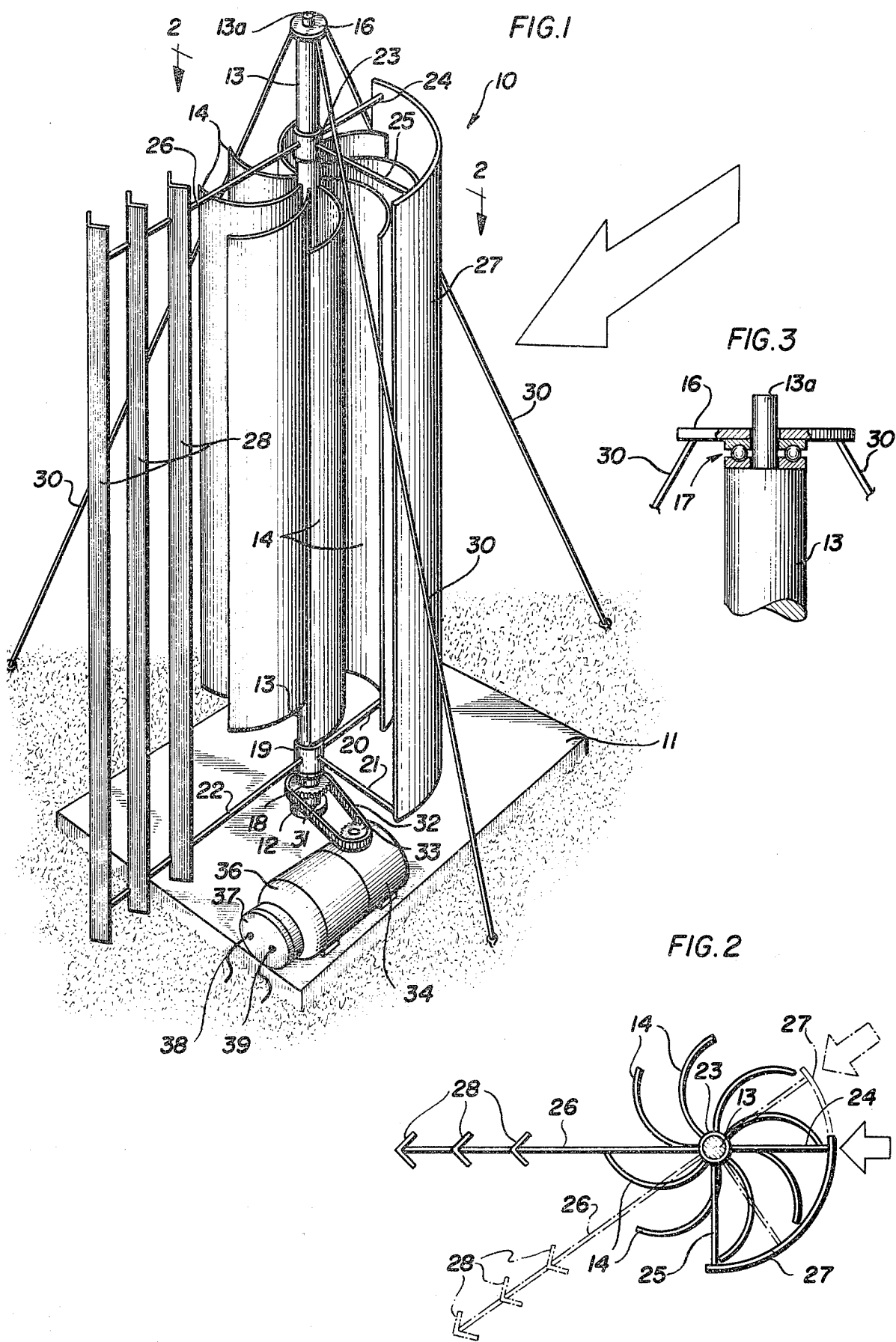

WINDMILL STRUCTURE

BACKGROUND OF THE INVENTION

This invention relates generally to improvements in the structure of windmills used primarily for converting wind energy to mechanical and/or electrical energy, and more particularly to a windmill structure and its combination of active moving components and static support components that provide substantial useful improvement over existing windmill structures which are now commonly used. However, it will be understood that while this invention is directed particularly to windmill structures used for mechanical and/or electrical power generation, the specific device disclosed herein can be used in other allied fields, such as water and oil pumping or the like.

Heretofore, the building of windmill structures for converting wind energy to mechanical energy, and therefrom to either electrical energy or some other form of useful work, has been relatively expensive and complicated. One of the primary reasons for the expense of prior art structures is the large amount of supporting structure needed to elevate wind-engaging blades to an altitude sufficiently high to receive wind energy. In many cases prior art windmill structures have a massive nonrotating support base and in some instances more efficient windmill structures may also have a rotating support base which has wind-engaging blades associated therewith. This type of prior art structure is not only complicated and expensive to manufacture, but in many cases requires continual maintenancing during its useful life as a result of exposure to the elements. The requirement for a plurality of moving blades on a moving support base may require continual oiling and maintenance.

In addition to the disadvantage of continual maintenance, the additional weight of such prior art windmill structures requires a relatively large base of support, generally of poured concrete or the like, to be used.

SUMMARY OF THE INVENTION

Accordingly, it is an object of this invention to provide a new and improved windmill structure which is relatively inexpensive and simple to manufacture while being extremely efficient and reliable in use.

Another object of this invention is to provide a new windmill structure which has the minimum number of static or nonmovable components, thereby substantially reducing the weight of such structure.

Yet another object of this invention is to provide a new and improved windmill structure wherein almost all of the weight of the windmill structure is obtained by components.

Briefly, the windmill structure of this invention provides a support base with a thrust bearing member formed therein. A vertically disposed rotating shaft extends upwardly from the support base and has a plurality of outwardly directed wind-engaging blades extending therefrom. In the preferred embodiment, the blades are C-shaped in configuration when viewed from a horizontal cross section. However, other configurations of blades may be used. The upper end of the shaft is provided with a reduced diameter portion to receive a thrust bearing upon which is placed a plate member. Guide wires are secured to the plate member and extend angularly downwardly to be secured to the area about the base substantially in the same manner of securing a mast to a sailboat. The stays or guide wires are sufficiently displaced from the wind-engaging blades so as not to interfere with their rotation. A shield is secured to the vertical shaft by collars positioned above and below the wind-engaging blades, these collars being adapted to rotate relative to said shaft. Also secured to and extending from the collars are rods which have vertically disposed substantially parallel wind vane-engaging members. These wind vane-engaging members are V-shaped in the cross section with the concave portion thereof extending toward the wind-engaging blades. As the direction of wind changes, the movable wind vane members will rotate the collars about the shaft which, in turn, will move the shield which is positioned adjacent one-fourth of the periphery of the wind-engaging blades. This shield will then prevent the wind from affecting the back side, or the power producing side, of the wind-engaging blade. This increases the efficiency of the windmill structure.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a perspective view of a windmill structure constructed in accordance with the principles of this invention and further illustrates a mechanical power take-off and electrical generator for converting wind energy to mechanical energy and therefrom to electrical energy;

FIG. 2 is a plan view of the windmill structure of FIG. 1, illustrating the relative movement of the wind shield and the movable vane member as well as illustrating the general configuration of the wind-engaging blades; and FIG. 3 is a fragmentary view illustrating the thrust bearing and plate member located at the top of the windmill structure.

DETAILED DESCRIPTION OF THE ILLUSTRATED EMBODIMENT

Referring first to FIG. 1, there is seen a windmill structure for converting wind energy to mechanical energy which is constructed in accordance with the principles of this invention and which is designated generally by reference numeral 10. The windmill structure 10 includes a base support member 11 preferably of poured concrete, steel, or other suitable support forming means. A thrust bearing support member 12 is positioned substantially centrally of the base 11 and is of any suitable type, preferably being a rotating thrust bearing of the commercially available type. Extending vertically upwardly from the thrust bearing 12 is a rotating shaft 13 from which extends radially outwardly a plurality of wind-engaging blades 14. In the illustrated embodiment the number of wind-engaging blades is eight, but it will be understood that any suitable number of blades may be utilized. Furthermore, the illustrated embodiment shows the wind-engaging blades as being substantially C-shaped in the cross section, as can be seen in FIG. 2. However, other configurations may be utilized without departing from the spirit and scope of this invention.

To support the shaft 13 for rotation about its vertical axis, the plate member 16 is placed at the upper end of the shaft and has an aperture therein to receive a reduced diameter portion 13a of the shaft. As best seen in FIG. 3, the plate 16 and reduced diameter portion 13a cooperate with a thrust bearing member 17 positioned at the upper end of the shaft. It will be understood that while a ball bearing-type of thrust bearing structure is illustrated, roller bearing or pin bearing structures may be utilized. Furthermore, a point contact arrangement may be used by shaping the upper end of the shaft 13 as a needlepoint and placing a cone-type plate structure at the upper end so that minimum contact area is achieved.

A collar member 18 is secured to the lower end of the shaft 13 and rotates with the shaft. Positioned above the collar member 18 is the rotating collar 19 to which is secured the radially outwardly rod members 20, 21 and 22. Positioned at the upper end of the shaft is a second collar member 23 to which is secured the rod members 24, 25 and 26. Secured to the rod members 20, 21 and 24, 25 is an arcuately shaped shield 27 which covers substantially one-quarter of the peripheral area of the wind-engaging blades. This shield 27 would increase the efficiency of the windmill structure by preventing wind from impinging on the backside of the wind-engaging blades, thereby exposing only the active blade members to the oncoming wind. Secured to the rod members 22 and 26 are the plurality of vertically disposed substantially parallel movable vane members 28. These vane members are arranged so as to capture wind and rotate the collars 19 and 23 thereby rotating the position of the shield 27. It will be understood that other configurations of the movable vanes 28 may be utilized.

Substantially the entire windmill structure is formed of active components, i.e., movable components necessary to convert wind energy to mechanical energy. The only passive or support structure required is the plate member 16 and the upper and lower thrust bearings together with a plurality of guide wires 30, positioned at various locations about the windmill structure.

Secured to the bottom end of shaft 13 is a gear sprocket 31 which engages a flexible chain 32 which, in turn, extends substantially horizontally to engage a second gear sprocket 33. The gear sprocket 33 extends from and is connected to a gear reduction apparatus 34, which may be of any suitable commercially available type. Secured to the gear reduction member 34 is an electrical generator 36 for converting the mechanical energy developed by the wind energy to electrical energy. The generator 36 may include means for reducing a DC output by providing a rectifier and capacitor circuit which may be located in a housing portion 37 at the end of the generator 36. Extending from the housing 37 is a pair of lead wires 38 and 39 for connection to any suitable electrical utilization source such as a battery to be charged.

FIG. 2 best illustrates the cooperation of the shield member 27 with the movable vane members 28. As the direction of wind changes, as indicated by the solid and phantom line arrows, the movable vane member 28 will cause the collars 19 and 23 to rotate about the shaft 13. This action will place the shield 27 in a more advantageous position to be at all times covering approximately one-half of the upwind side of the wind-engaging blades, this being the inactive side of the windmill.

While a single specific embodiment of the present invention has been illustrated herein, it will be understood that variations and modifications may be effected without departing from the spirit and scope of the novel concepts set forth in the accompanying claims.

The invention is claimed as follows:

1. In a windmill structure for converting wind energy to mechanical energy, the combination comprising: a base structure, thrust bearing support means formed in said base structure for rotatably receiving the bottom end of a vertically disposed shaft, a shaft member positioned within said base structure with the bottom end thereof journaled within said thrust bearing support means, a plurality of wind-engaging blades secured to and extended from said shaft member, a thrust bearing plate member positioned at the upper end of said shaft, support means secured to said thrust bearing plate means to support said shaft, whereby rotation of said shaft is obtained by said plurality of wind-engaging blades, shield means first and second spaced apart collars rotatably secured to said shaft below and above said wind-engaging blade means, means extending from said collars to said shield means for supporting said shield means, and directional wind vane means extending from said collars to rotate said shield means to be predominantly facing the direction of the wind, said directional vane comprises a pair of spaced apart rods secured to and extending from said collar means, and a plurality of substantially parallel vertically disposed vane members being substantially triangular in configuration with the apex thereof receiving said rods therethrough, said vertically disposed vane members are triangular in configuration and have the concave portion thereof directed toward said shaft, whereby said wind-engaging blades extended from one side of said vertical shaft engage the wind and wind-engaging blades extending on the opposite side of said shaft, behind shield means, are free of impingement from the wind, whereby the effective overall efficiency of said wind-engaging blades is increased.

2. In the windmill structure for converting wind energy to mechanical energy as set forth in claim 1, wherein said wind-engaging blades are configurated to provide a concave surface to the direction of the wind when on one side of said vertical shaft and a convex surface to the direction of the wind when on the other side of said shaft.

3. In the windmill structure for converting wind energy to mechanical energy as set forth in claim 2, wherein said wind-engaging blades are C-shaped in configuration when viewed in the cross section.

4. In the windmill structure for converting wind energy to mechanical energy as set forth in claim 1, wherein said shaft has the upper end thereof provided with a reduced diameter portion and said thrust bearing plate means is formed by a thrust bearing secured to said reduced diameter portion, and an apertured plate positioned over said thrust bearing and about said reduced diameter portion, said apertured plate having a plurality of holes formed about the periphery thereof to receive guide wires.

5. In the windmill structure for converting wind energy to mechanical energy as set forth in claim 1 further including gear means secured to said vertical shaft near the bottom end thereof, power unit means secured to said base structure and drive means connected between said gear means and said power unit means, and utilization means for utilizing mechanical energy produced by said power unit means.

6. In the windmill structure for converting wind energy to mechanical energy as set forth in claim 5, wherein said utilization means is an electrical generator.

7. In the windmill structure for converting wind energy to mechanical energy as set forth in claim 1, wherein said support means are a plurality of downwardly angularly disposed guide and support wires each having one end secured to said thrust bearing plate means and the other end anchored outwardly of said thrust bearing support means.

* * * * *